(12) United States Patent
Hotta et al.

(10) Patent No.: US 8,929,001 B2
(45) Date of Patent: Jan. 6, 2015

(54) DISPLAY DEVICE

(75) Inventors: Aira Hotta, Kanagawa-ken (JP);
Shigeru Shimakawa, Kanagawa-ken (JP); Haruhiko Okumura, Kanagawa-ken (JP); Akihisa Moriya, Kanagawa-ken (JP); Takashi Sasaki, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 147 days.

(21) Appl. No.: 13/531,723

(22) Filed: Jun. 25, 2012

(65) Prior Publication Data
US 2013/0077175 A1  Mar. 28, 2013

(30) Foreign Application Priority Data

Sep. 28, 2011  (JP) .................................. 2011-212663

(51) Int. Cl.
*G02B 3/08*  (2006.01)
*G02B 27/14*  (2006.01)
*G02B 27/01*  (2006.01)

(52) U.S. Cl.
CPC ................ *G02B 3/08* (2013.01); *G02B 27/017* (2013.01); *G02B 2027/0178* (2013.01)
USPC ............ 359/743; 359/630; 359/631; 359/742

(58) Field of Classification Search
USPC .................. 359/629, 630, 631, 741, 742, 743
See application file for complete search history.

(56) References Cited

U.S. PATENT DOCUMENTS

| 2010/0073579 | A1 | 3/2010 | Okada et al. |
| 2011/0051077 | A1 | 3/2011 | Sugihara et al. |
| 2011/0228403 | A1 | 9/2011 | Masuda et al. |

FOREIGN PATENT DOCUMENTS

| CN | 201340485 | 11/2009 |
| CN | 102004317 | 4/2011 |
| CN | 102193118 | 9/2011 |
| JP | 2000-221441 | 8/2000 |
| JP | 2000-249967 | 9/2000 |
| JP | 2006-209144 | 8/2006 |
| JP | 2010-078860 | 4/2010 |

OTHER PUBLICATIONS

Office Action for Chinese Patent Application No. 201210215891.3 Dated Jun. 25, 2014, 20 pgs.

*Primary Examiner* — Jack Dinh
(74) *Attorney, Agent, or Firm* — Amin, Turocy & Watson, LLP

(57) ABSTRACT

According to one embodiment, a display device includes an image projection unit, an optical unit and a mounting unit. The image projection unit emits an image light. The optical unit includes a first optical layer having first and second major surfaces, a second optical layer having third and fourth major surfaces and an intermediate layer provided between the second and third major surfaces. At least a portion of the image light travelling from the first major surface toward the second major surface is reflected by the intermediate layer. At least a portion of a background light travelling from the fourth major surface toward the third major surface is transmitted by the intermediate layer. The first major surface or the fourth major surface is a curved surface. The mounting unit is linked to the image projection unit and the optical unit.

19 Claims, 9 Drawing Sheets

DISPLAY DEVICE

CROSS-REFERENCE TO RELATED APPLICATIONS

This application is based upon and claims the benefit of priority from the prior Japanese Patent Application No. 2011-212663, filed on Sep. 28, 2011; the entire contents of which are incorporated herein by reference.

FIELD

Embodiments described herein relate generally to a display device.

BACKGROUND

Head mounted displays that are mounted to the head of a user (a human viewer) to display onto the eye of the user have been developed. For example, a display device has been proposed in which a reflective surface is provided on the back surface of a transparent member and light reflected at the reflective surface is guided into the eye of the user.

It is desirable for such a display device to be easy to view and use.

DETAILED DESCRIPTION

Figure 1:
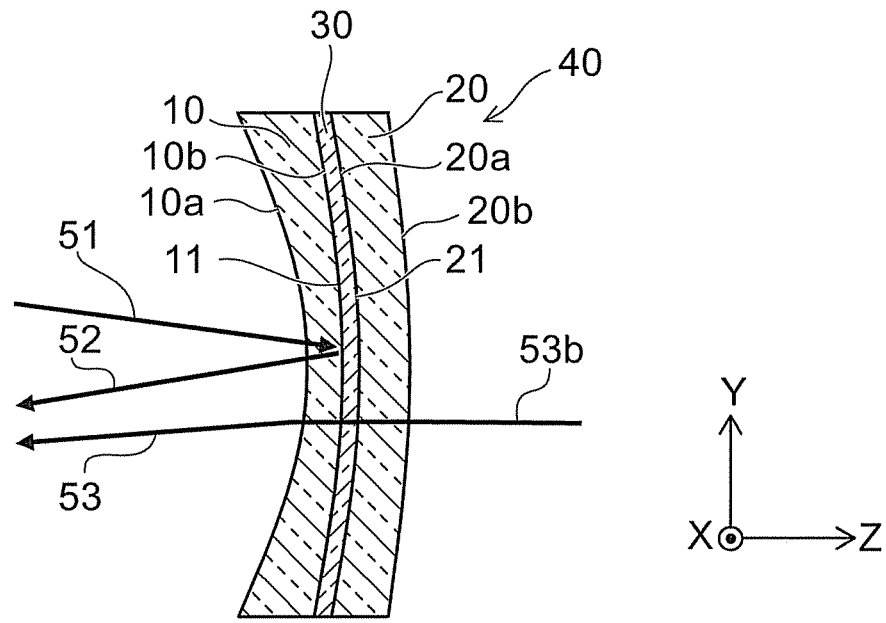
FIG. 1 is a schematic cross-sectional view showing a display device according to a first embodiment.

According to one embodiment, a display device includes an image projection unit, an optical unit and a mounting unit. The image projection unit emits an image light including an image. The optical unit includes a first optical layer, a second optical layer and an intermediate layer. The first optical layer has a first major surface and a second major surface on a side opposite to the first major surface. The first optical layer is light-transmissive. The second major surface includes a protruding portion having a surface having a curved configuration. The second optical layer has a third major surface and a fourth major surface on a side opposite to the third major surface. The second optical layer is light-transmissive. The third major surface faces the second major surface and includes a recessed portion recessed along the protruding portion. The intermediate layer is provided between the second major surface and the third major surface. At least a portion of the image light travelling from the first major surface toward the second major surface is reflected by the intermediate layer. A reflected light is obtained at the intermediate layer. At least a portion of a background light traveling from the fourth major surface toward the third major surface is transmitted by the intermediate layer. At least one selected from the first major surface and the fourth major surface is a curved surface. The mounting unit is linked to the image projection unit and the optical unit to regulate a relative positional relationship between the optical unit and an eye of a human viewer to cause the image light to enter the optical unit from the first major surface and to cause the reflected light to emerge from the second major surface to enter the eye of the human viewer.

Various embodiments will be described hereinafter with reference to the accompanying drawings.

The drawings are schematic or conceptual; and the proportions of sizes between portions and the like are not necessarily the same as the actual values thereof. The dimensions and the proportions may be illustrated differently among the drawings, even for identical portions.

In the drawings and the specification of the application, components similar to those described in regard to a drawing thereinabove are marked with like reference numerals, and a detailed description is omitted as appropriate.

First Embodiment

FIG. 1 is a schematic cross-sectional view illustrating the configuration of a display device according to a first embodiment.

Figure 2:
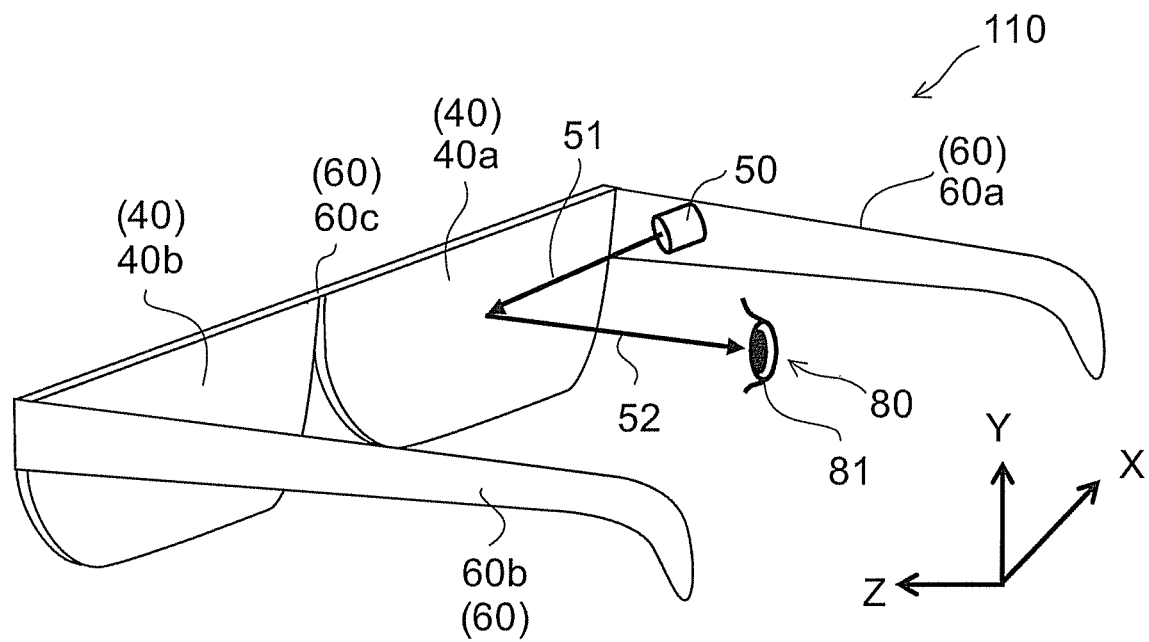
FIG. 2 is a schematic perspective view showing the display device according to the first embodiment.

FIG. 2 is a schematic perspective view illustrating the configuration of the display device according to the first embodiment.

Figure 3:
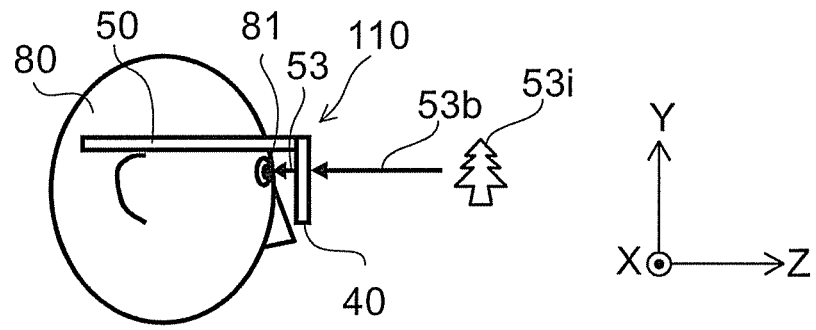
FIG. 3 is a schematic view showing the state of use of the display device according to the first embodiment.

FIG. 3 is a schematic view illustrating the state of use of the display device according to the first embodiment.

Figure 4:
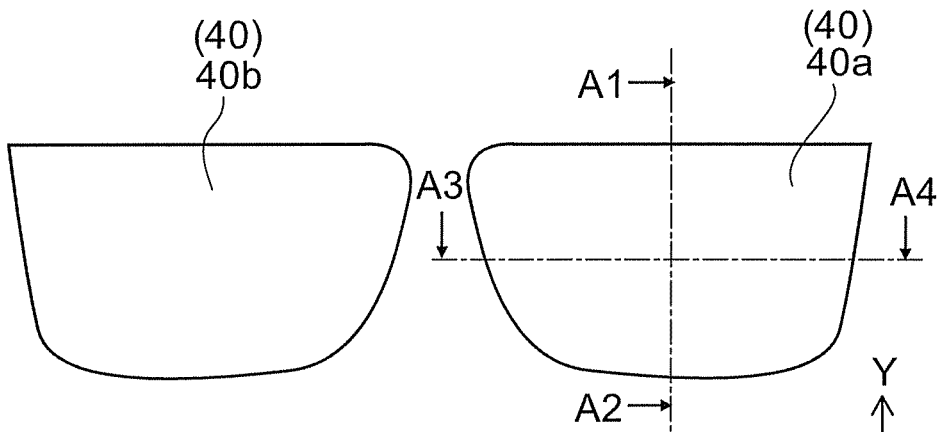
FIG. 4 is a schematic plan view showing the display device according to the first embodiment.

FIG. 4 is a schematic plan view illustrating the configuration of the display device according to the first embodiment.

FIG. 1 is a cross-sectional view along line A1-A2 of FIG. 4.

As illustrated in FIG. 2, the display device 110 according to the embodiment includes an image projection unit 50, an optical unit 40, and a mounting unit 60.

The image projection unit 50 is configured to emit an image light 51 that includes an image. The image light 51 is, for example, a laser light.

The optical unit 40 is disposed, for example, in front of an eye 81 of a human viewer 80 (a user). For example, a right eye optical unit 40a disposed in front of the right eye of the human viewer 80 may be used as the optical unit 40. Also, a left eye optical unit 40b disposed in front of the left eye of the human viewer 80 may be used as the optical unit 40. At least one selected from the right eye optical unit 40a and the left eye optical unit 40b is used as the optical unit 40.

For example, the image projection unit 50 causes the image light 51 to enter at least one selected from the right eye optical unit 40a and the left eye optical unit 40b. A right eye image projection unit that causes the image light to enter the right eye optical unit 40a and a left eye image projection unit that causes the image light to enter the left eye optical unit 40b may be provided.

Hereinbelow, the case is described where the right eye optical unit 40a is used as the optical unit 40. The following description may be applied also to the left eye optical unit 40b.

The mounting unit 60 is linked to the image projection unit 50 and the optical unit 40. The mounting unit 60 holds the image projection unit 50 and the optical unit 40 (e.g., at least one selected from the right eye optical unit 40a and the left eye optical unit 40b).

The mounting unit 60 may include, for example, a right side mounting member 60a, a left side mounting member 60b, and a linking portion 60c. The right side mounting member 60a is disposed, for example, on the ear on the right side of the human viewer 80. The left side mounting member 60b is disposed, for example, on the ear on the left side of the human viewer 80. The linking portion 60c is linked to, for example, the right side mounting member 60a and the left side mounting member 60b. For example, the linking portion 60c holds the right eye optical unit 40a and the left eye optical unit 40b.

The display device 110 has, for example, a glasses-like or goggle-like configuration. However, the embodiment is not limited thereto. The configuration of the display device 110 is arbitrary.

As illustrated in FIG. 2, the image light 51 emitted from the image projection unit 50 enters the optical unit 40; and reflected light 52 obtained by the image light 51 being reflected by the optical unit 40 enters the eye 81 of the human viewer 80.

Here, a direction from the human viewer 80 toward the front is taken as a Z-axis direction. A direction from the left toward the right of the human viewer 80 is taken as an X-axis direction. A direction upward from under the human viewer 80 is taken as a Y-axis direction. The X-axis direction is a direction from the left eye optical unit 40b toward the right eye optical unit 40a. The Y-axis direction is a direction perpendicular to the Z-axis direction and the X-axis direction.

As illustrated in FIG. 3, the human viewer 80 can view a background image 53i included in transmitted light 53 that passes through the optical unit 40. The display device 110 is, for example, an optical see-through head mounted display device.

As illustrated in FIG. 4, the optical unit 40 (e.g., at least one selected from the right eye optical unit 40a and the left eye optical unit 40b) has a glasses lens-like configuration.

FIG. 1 illustrates an example of the configuration of the optical unit 40.

As illustrated in FIG. 1, the optical unit 40 includes a first optical layer 10, a second optical layer 20, and an intermediate layer 30.

The first optical layer 10 includes a first major surface 10a and a second major surface 10b. The second major surface 10b is the surface of the first optical layer 10 on the side opposite to the first major surface 10a. The second major surface 10b includes a protruding portion 11. The protruding portion 11 has a surface having a curved configuration. The first optical layer 10 is light-transmissive.

The second optical layer 20 includes a third major surface 20a and a fourth major surface 20b. The third major surface 20a faces the second major surface 10b. The third major surface 20a includes a recessed portion 21. The recessed portion 21 is recessed along the protruding portion 11. The fourth major surface 20b is the surface of the second optical layer 20 on the side opposite to the third major surface 20a. The second optical layer 20 is light-transmissive.

At least one selected from the first major surface 10a and the fourth major surface 20b is a curved surface. In this example, both the first major surface 10a and the fourth major surface 20b are, curved surfaces.

The intermediate layer 30 is provided between the second major surface 10b and the third major surface 20a. The intermediate layer 30 contacts, for example, the second major surface 10b and the third major surface 20a. The intermediate layer 30 reflects at least a portion of the light (for example, the image light 51) travelling from the first major surface 10a toward the second major surface 10b (e.g., the image light 51). The reflected light 52 is obtained at the intermediate layer 30. The intermediate layer 30 transmits at least a portion of the light (for example, background light 53b including the background image 53i) travelling from the fourth major surface 20b toward the third major surface 20a. The transmitted light 53 including the background image 53i is obtained.

The mounting unit 60 regulates the relative positional relationship between the optical unit 40 and the eye 81 of the human viewer 80 to cause the image light 51 to enter the optical unit 40 from the first major surface 10a and to cause the reflected light 52 to emerge from the second major surface 10b to enter the eye 81 of the human viewer 80. The reflected light 52 is obtained by the image light 51 being reflected at the intermediate layer 30.

Thereby, a display device that is easy to view and use can be provided.

The first optical layer 10 and the second optical layer 20 may include glass, a resin, or the like that is transmissive with respect to visible light.

The intermediate layer 30 may include, for example, a metal film (e.g., an aluminum film, etc.), a metal compound film, and the like. The intermediate layer 30 reflects the image light 51 and transmits the transmitted light 53 by the thickness of the intermediate layer 30 being sufficiently thin.

For example, a reflective/transmissive film made of a multilayered stacked film and the like may be used as the intermediate layer 30. Such a multilayered stacked film has, for example, wavelength selectivity. For example, the intermediate layer 30 may include multiple first layers and a second layer provided between the multiple first layers, where the second layer has a refractive index different from that of the multiple first layers. In such a case as well, the intermediate layer 30 reflects the image light 51 and transmits the transmitted light 53.

It is favorable for the transmittance with respect to visible light (e.g., green light) of the intermediate layer 30 to be, for example, not less than 90% (with a reflectance less than 10%). In the case where the transmittance of the intermediate layer 30 is too low, the transmitted light 53 does not sufficiently reach the eye 81. By the transmittance of the intermediate layer 30 being not less than 90%, a bright actual view (the background image 53i which is an image in real space) is obtained.

In the display device 110, the protruding portion 11 provided in the second major surface 10b protrudes; and the recessed portion 21 provided in the third major surface 20a is recessed. For example, the protruding portion 11 protrudes in a curved configuration along the Z-axis direction; and the recessed portion 21 is recessed in a curved configuration along the Z-axis direction. Thereby, the intermediate layer 30 functions as, for example, a concave mirror when the image light 51 is reflected at the intermediate layer 30. The image included in the reflected light 52 obtained by being reflected at the intermediate layer 30 is larger than the image included in the image light 51. In other words, the image of the intermediate layer 30 is enlarged. Thereby, the display device 110 can provide an easily-viewable display to the human viewer 80.

In the display device 110, for example, the curvature of the first major surface 10a is different from the curvature of the fourth major surface 20b.

In the example illustrated in FIG. 1, the fourth major surface 20b protrudes in a curved configuration. The first major surface 10a is recessed in a curved configuration.

In the case where the curvature of the first major surface 10a is larger than the curvature of the fourth major surface 20b (in the case where the curvature radius of the first major surface 10a is smaller than the curvature radius of the fourth major surface 20b), the optical unit 40 functions as a concave lens for the transmitted light 53. Such a configuration is applied in the optical unit 40 illustrated in FIG. 1.

Conversely, in the case where the curvature of the first major surface 10a is smaller than the curvature of the fourth major surface 20b (in the case where the curvature radius of the first major surface 10a is larger than the curvature radius of the fourth major surface 20b), the optical unit 40 functions as, for example, a convex lens for the transmitted light 53.

In the case where the optical unit 40 functions as a concave lens or a convex lens, the optical unit 40 may function to correct the vision of the human viewer 80.

According to the display device 110, the human viewer 80 can view the background image 53i in a state of corrected vision via the optical unit 40 in addition to being able to view the image obtained from the image projection unit 50. For example, the display device 110 can make the background image 53i easily viewable to the human viewer 80 while displaying an enlarged and easily-viewable display image to the human viewer 80.

Thus, according to the display device 110 according to the embodiment, a display device that is easy to view and use can be provided.

Especially in head mounted display devices that are optical see-through display devices, the human viewer 80 views the background image 53i with the superimposed display image. In such a case, circumstances exist for some human viewers 80 in which the background image 53i is viewed using glasses having a concave lens, a convex lens, and the like to correct vision. A configuration that considers the correction of the vision of the human viewer 80 when displaying the display image such that the display image is easy to view is not conventionally known.

Most lenses (the light-transmissive member disposed in front of the eye) of normal glasses have a curved surface around the eye. Therefore, the user does not feel much awkwardness in the case where the screen of the head mounted display device also has a curved surface around the eye. For example, a screen having a curved surface configuration around the eye is easy for the user to use. For example, the curvature of such a curved surface is designed to match the preferences of the user based on the outward appearance, the ease of use, and the like of the display device.

On the other hand, a reflection screen for presenting the display image to the human viewer 80 is designed to have the prescribed configuration and optical characteristics by designing the characteristics of the image projection unit 50, the distance between the optical unit 40 and the eye 81, and the like.

Therefore, it is desirable for the optical characteristics and the exterior form of the reflection screen disposed in front of the eye 81 to be designed independently from the exterior form of the optical unit 40. The inventors discovered that optical see-through display devices have special problems such as those recited above that are conventionally unknown.

The configuration of the display device 110 according to the embodiment is constructed to solve such newly discovered problems.

In the display device 110, a design that is appropriate for the display of the display image is applied to the intermediate layer 30 which functions as the reflection screen. On the other hand, a design that is desirable for viewing the background image 53i is applied to the exterior form and the optical characteristics of the optical unit 40.

For example, the first major surface 10a and the fourth major surface 20b of the optical unit 40 may have curved configurations. Thereby, the awkwardness felt by the user decreases and the use is easy. The first major surface 10a and the fourth major surface 20b may have, for example, cylindrical configurations (e.g., a cylindrical configuration having the X axis as an axis or a cylindrical configuration having the Y axis as an axis). One selected from the first major surface 10a and the fourth major surface 20b may have a planar configuration.

The configurations of the first major surface 10a and the fourth major surface 20b of the optical unit 40 may be designed such that, for example, the optical unit 40 functions as a concave lens or a convex lens for the transmitted light 53 passing through the optical unit 40. Thereby, the vision of the human viewer 80 can be corrected.

For example, it may be considered to use the configuration of a reference example in which the second optical layer 20 is not provided in the optical unit 40, and the optical unit 40 includes the first optical layer 10 and a reflective layer that is provided on the first major surface 10a or the second major surface 10b of the first optical layer 10. In such a reference example, the image light 51 is reflected at the reflective layer; and the reflected light 52 of the image light 51 enters the eye 81 of the human viewer 80. At this time, the transmitted light 53 including the background image 53i enters the eye 81 of the human viewer 80 by the reflective layer being reflective/transmissive. In this configuration, distortion of the background image 53i occurs when the human viewer 80 views the background image 53i. This is because a refraction effect occurs at the reflective layer when the transmitted light 53 passes through the reflective layer (the reflective/transmissive layer).

Conversely, in the display device 110 according to the embodiment, the intermediate layer 30 that reflects the image light 51 is provided between the first optical layer 10 and the second optical layer 20. Therefore, the operation of the first optical layer 10 on the transmitted light 53 is compensated by the operation of the second optical layer 20 on the transmitted light 53. Therefore, the distortion of the background image 53i included in the transmitted light 53 is suppressed.

Thus, the display device 110 includes an ocular optical system that guides the image projection unit 50 and the image supplied from the image projection unit 50 into the eye. The optical unit 40 is used as the ocular optical system. The image light 51 including the display image is projected toward the optical unit 40 from the side of the eye 81 or from above the eye 81 of the human viewer 80. The optical unit 40 widens the visual field and transmits the background image 53i of the external environment in a state in which the distortion is suppressed. Simultaneously, the optical unit 40 enlarges the projected image and reflects the enlarged image in the direction of the eye 81. Thereby, a display device that is easy to view and use is provided.

In the display device 110 according to the embodiment, it is desirable for the refractive index of the first optical layer 10 to be the same as the refractive index of the second optical layer 20. For example, it is desirable for the absolute value of the difference between the refractive index of the first optical layer 10 and the refractive index of the second optical layer 20 to be not more than $1\times10^{-3}$. Thereby, the distortion of the background image 53$i$ included in the transmitted light 53 can be effectively suppressed.

Figure 5:
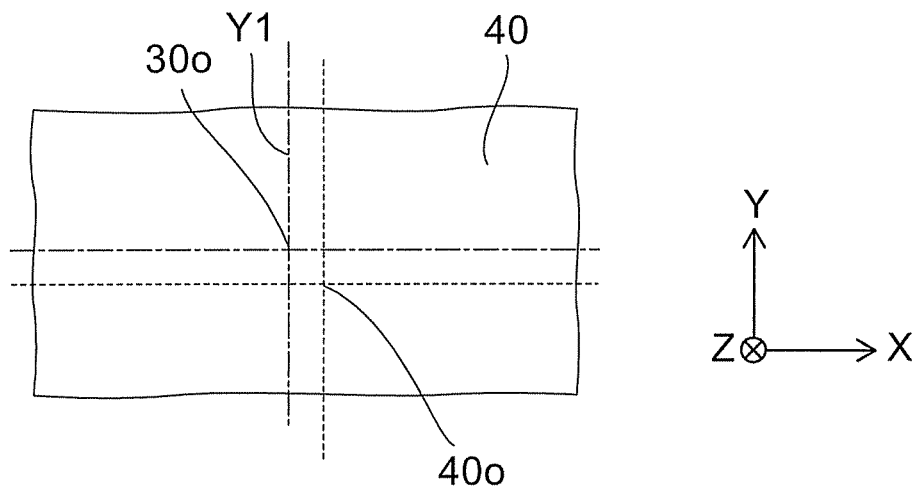
FIG. 5 is a schematic plan view showing the display device according to the first embodiment.

FIG. 5 is a schematic plan view illustrating the configuration of the display device according to the first embodiment.

As illustrated in FIG. 5, an optical axis 40$o$ (a major axis) for the transmitted light 53 exists in the optical unit 40 of the display device 110. The optical axis 40$o$ is the optical axis (the major axis) when the light (the transmitted light 53) entering from the fourth major surface 20$b$ of the optical unit 40 passes through the third major surface 20$a$, the intermediate layer 30, the second major surface 10$b$, and the first major surface 10$a$.

For example, in the case where the optical unit 40 functions as a concave lens or a convex lens, the optical axis 40$o$ for the transmitted light 53 of the optical unit 40 corresponds to the optical axis (the major axis) of the concave lens or the optical axis (the major axis) of the convex lens.

On the other hand, an optical axis 30$o$ (a major axis) for the image light 51 exists in the intermediate layer 30. The optical axis 30$o$ is the optical axis (the major axis) of the intermediate layer 30 when the image light 51 enters the optical unit 40 from the first major surface 10$a$ and is reflected at the intermediate layer 30. For example, the optical axis 30$o$ corresponds to the optical axis (the major axis) of the reflected light 52.

The optical axis 30$o$ of the intermediate layer 30 for the image light 51 corresponds to the optical axis (the major axis) of a concave mirror when the intermediate layer 30 functions as the concave mirror.

The optical axis 30$o$ of the intermediate layer 30 for the image light 51 substantially matches the optical axis 40$o$ of the optical unit 40 for the transmitted light 53.

For example, as the position of the optical axis 30$o$ of the intermediate layer 30 for the image light 51 moves away from the optical axis 40$o$ of the optical unit 40 for the transmitted light 53, the distortion of the display image included in the reflected light 52 and the background image 53$i$ included in the transmitted light 53 increases; and the visual field in which a good image is obtained becomes narrow.

It is favorable for the distance from the position (e.g., the position in the X-Y plane) of the optical axis 30$o$ of the intermediate layer 30 when the image light 51 enters the optical unit 40 from the first major surface 10$a$ and is reflected at the intermediate layer 30 to the position (e.g., the position in the X-Y plane) of the optical axis 40$o$ when the light (the transmitted light 53) enters from the fourth major surface 20$b$ and passes through the third major surface 20$a$, the intermediate layer 30, the second major surface 10$b$, and the first major surface 10$a$ to be not more than 500 micrometers (μm).

By the distance between the position of the optical axis 30$o$ and the position of the optical axis 40$o$ being not more than 500 μm, the distortion of the image can practically be sufficiently small; and the visual field in which a good display is obtained can practically be sufficiently wide. Thereby, a good image can be provided to the human viewer 80 particularly, for example, in an AR (Augmented Reality) display that displays by superimposing the display image on the actual view (the background image 53$i$).

FIG. 6A to FIG. 6F are schematic cross-sectional views illustrating configurations of display devices according to the first embodiment.

These drawings correspond to, for example, the cross section along line A1-A2 of FIG. 4. These drawings illustrate several examples of other optical units that are usable in the display device 110 according to the embodiment.

Figure 6A:
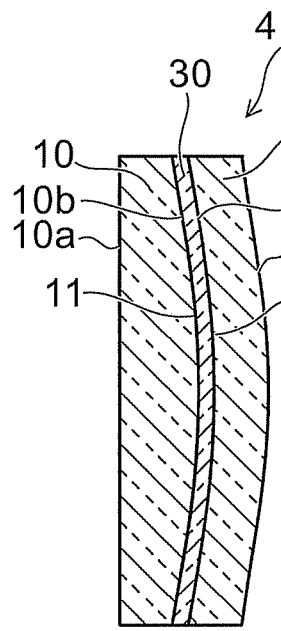
FIG. 6A to FIG. 6F are schematic cross-sectional views showing display devices according to the first embodiment.

In an optical unit 41$a$ as illustrated in FIG. 6A, the first major surface 10$a$ is substantially a plane. The fourth major surface 20$b$ protrudes in a curved configuration.

Figure 6B:
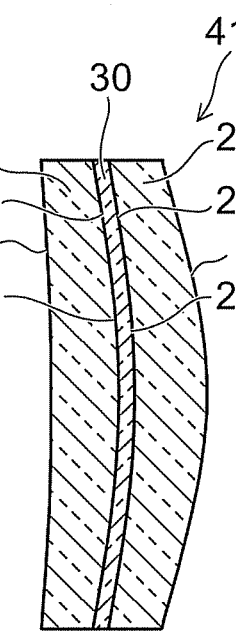

In an optical unit 41$b$ as illustrated in FIG. 6B, the first major surface 10$a$ is recessed in a curved configuration. The fourth major surface 20$b$ protrudes in a curved configuration. In this example, the curvature of the first major surface 10$a$ is smaller than the curvature of the fourth major surface 20$b$.

Figure 6C:
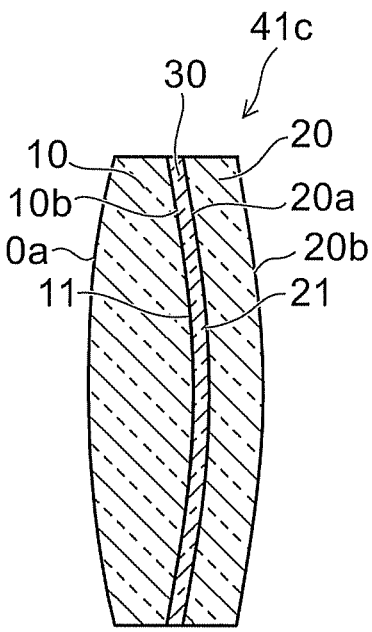

In an optical unit 41$c$ as illustrated in FIG. 6C, the first major surface 10$a$ protrudes in a curved configuration. The fourth major surface 20$b$ protrudes in a curved configuration.

Figure 6D:
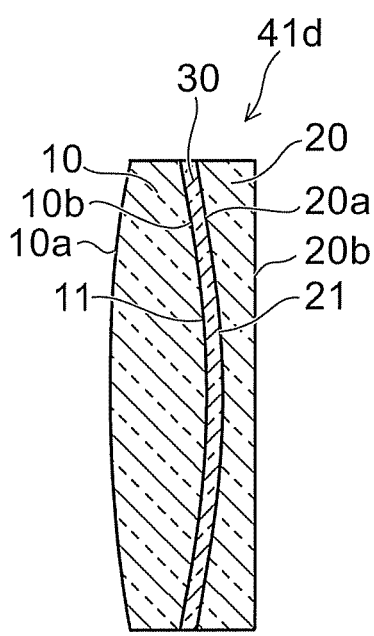

In an optical unit 41$d$ as illustrated in FIG. 6D, the first major surface 10$a$ protrudes in a curved configuration. The fourth major surface 20$b$ is substantially a plane.

The optical units 41$a$, 41$b$, 41$c$, and 41$d$ function as convex lenses for the transmitted light 53.

Figure 6E:
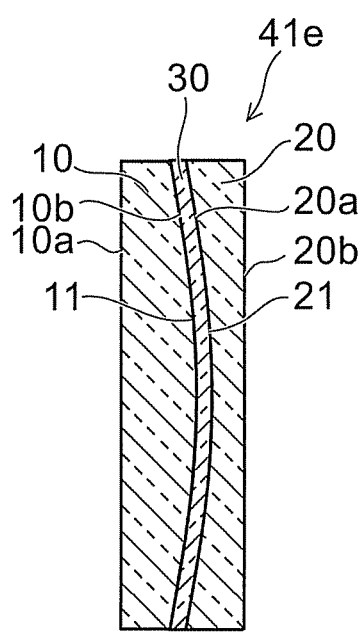

In an optical unit 41$e$ as illustrated in FIG. 6E, the first major surface 10$a$ is recessed in a curved configuration. The fourth major surface 20$b$ is substantially a plane. The optical unit 41$e$ functions as a concave lens for the transmitted light 53.

Figure 6F:
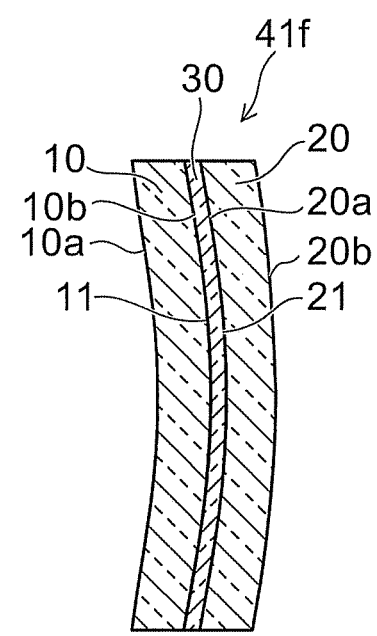

In an optical unit 41$f$ as illustrated in FIG. 6F, the first major surface 10$a$ is recessed in a curved configuration. The fourth major surface 20$b$ protrudes in a curved configuration. The curvature of the first major surface 10$a$ is the same as the curvature of the fourth major surface 20$b$. The fourth major surface 20$b$ is parallel to the first major surface 10$a$.

The optical unit 41$f$ does not function to enlarge or reduce the image of the transmitted light 53. For example, the optical unit 41$f$ satisfies the design preferences of the user or provides ease of use to the user.

Second Embodiment

The configuration of an optical unit of a display device according to the embodiment differs from the optical unit of the first embodiment. The points of the example of the optical unit of the embodiment that are different from those of the optical unit of the first embodiment will now be described; and a description of the configuration other than the optical unit is omitted.

Figure 7A:
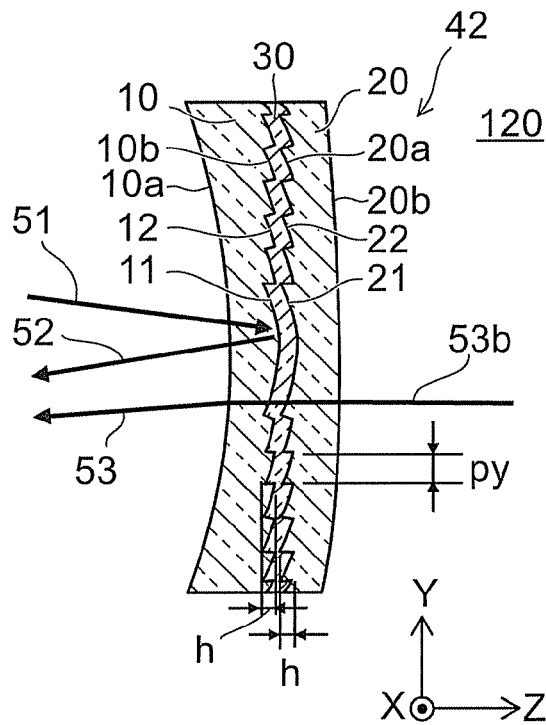
FIG. 7A and FIG. 7B are schematic cross-sectional views showing the configuration of the display device according to the second embodiment.
Figure 7B:
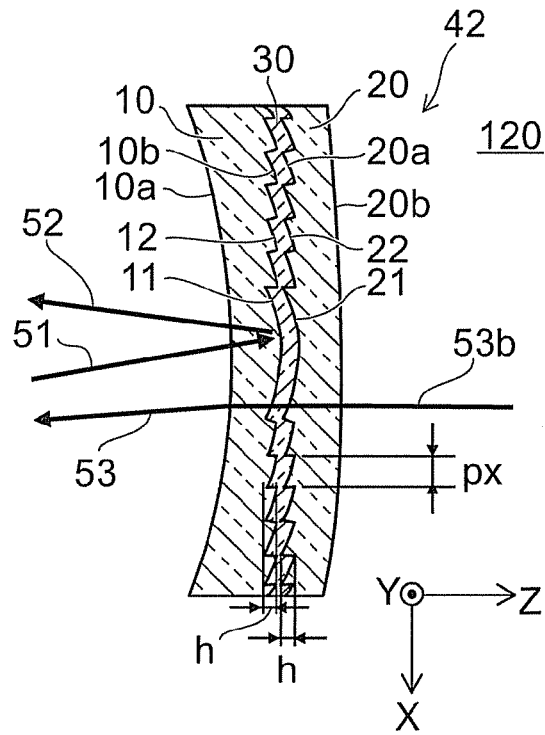

FIG. 7A and FIG. 7B are schematic cross-sectional views illustrating the configuration of the display device according to the second embodiment.

FIG. 7A corresponds to, for example, the cross section along line A1-A2 of FIG. 4 and is, for example, a cross-sectional view when cut by the Z-Y plane. FIG. 7B corresponds to the A3-A4 cross section of FIG. 4 and is, for example, a cross-sectional view when cut by the Z-X plane.

Figure 8:
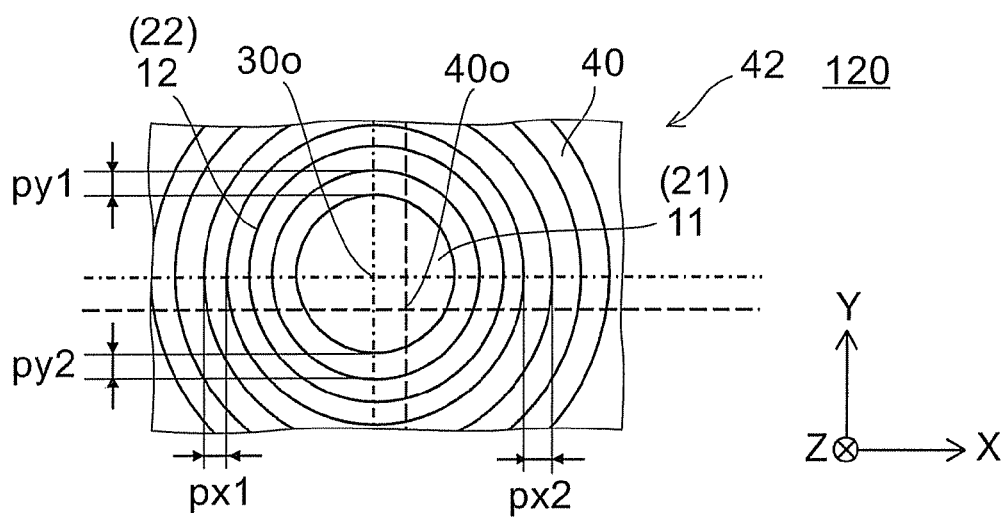
FIG. 8 is a schematic plan view showing the configuration of the display device according to the second embodiment.

FIG. 8 is a schematic plan view illustrating the configuration of the display device according to the second embodiment.

Figure 9:
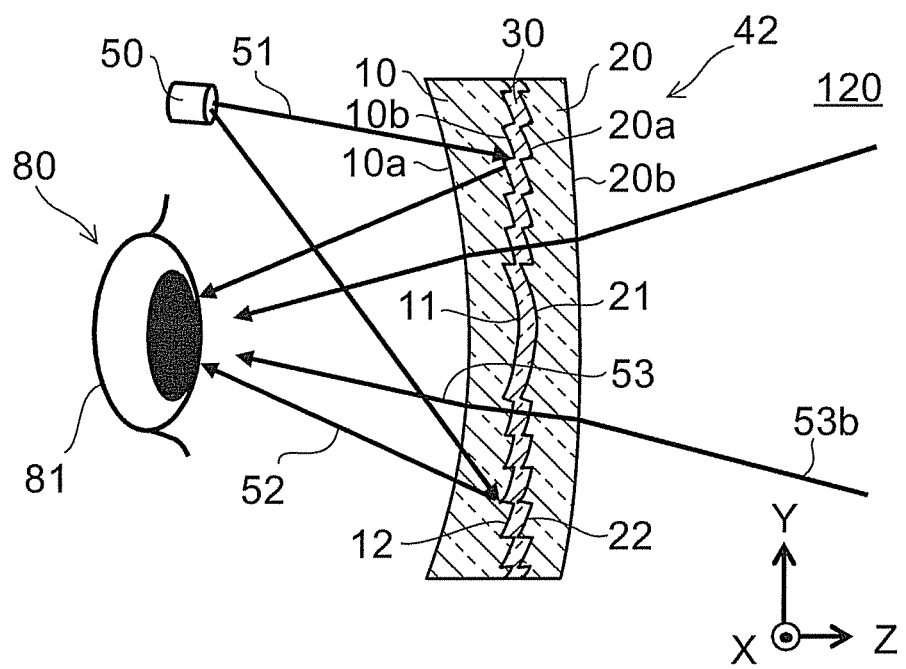
FIG. 9 is a schematic view showing the state of use of the display device according to the second embodiment.

FIG. 9 is a schematic view illustrating the state of use of the display device according to the second embodiment.

In an optical unit 42 of the display device 120 according to the embodiment as illustrated in FIG. 7A, FIG. 7B, and FIG. 8, the second major surface 10$b$ further includes multiple protrusions 12. The multiple protrusions 12 are provided around the protruding portion 11. Each of the multiple protrusions 12 is provided around the protruding portion 11 in the X-Y plane. Each of the multiple protrusions 12 is concentric with the protruding portion.

Also, the third major surface 20$a$ further includes multiple recesses 22. The multiple recesses 22 are provided around the recessed portion 21. Each of the multiple recesses 22 is provided around the recessed portion 21 in the X-Y plane. Each of the multiple recesses 22 is concentric with the recessed portion 21. The multiple recesses 22 conform to the multiple protrusions 12 respectively.

The second major surface 10b has the surface configuration of a Fresnel lens. In the second major surface 10b, the protruding portion 11 and the multiple protrusions 12 form the surface of the Fresnel lens. The third major surface 20a has the surface configuration of a Fresnel lens. In the third major surface 20a, the recessed portion 21 and the multiple recesses 22 form the surface of the Fresnel lens.

Thereby, the intermediate layer 30 functions as a concave mirror having the configuration of a Fresnel lens.

By the second major surface 10b having the surface configuration of a Fresnel lens and by the third major surface 20a having the surface configuration of a Fresnel lens, the entire optical unit 42 can be thinner while increasing (while maintaining) the curvature of the entire concave mirror of the intermediate layer 30.

As illustrated in FIG. 9, in the display device 120 as well, the image light 51 emitted from the image projection unit 50 enters the optical unit 42 from the first major surface 10a. The reflected light 52 obtained by the image light 51 being reflected at the intermediate layer 30 emerges from the second major surface 10b to reach the eye 81 of the human viewer 80. On the other hand, the light (the transmitted light 53) including the background image 53i entering from the fourth major surface 20b enters the eye 81 by passing through the optical unit 42.

In the display device 120, the Fresnel mirror (e.g., the intermediate layer 30) is provided in the interior of the optical unit 42. In other words, an uneven surface that forms a Fresnel mirror is provided in the interior of the glasses lens; and a reflective film is formed on the uneven surface. For example, the unevenness of the Fresnel lens may be formed in the surface of a base member used to form the first optical layer 10; the intermediate layer 30 may be formed on the unevenness; and a base member used to form the second optical layer 20 may be formed on the intermediate layer 30. Or, for example, the unevenness of the Fresnel lens may be formed in the surface of the base member used to form the second optical layer 20; the intermediate layer 30 may be formed on the unevenness; and the base member used to form the first optical layer 10 may be formed on the intermediate layer 30.

In such a case as well, the first optical layer 10 and the second optical layer 20 may include transparent glass, a resin, and the like. Then, a semi-transmissive reflective film (a metal deposition of aluminum, a wavelength-selective film made of multilayered films, or the like) is formed to form the intermediate layer 30. The transmittance of the intermediate layer 30 may be, for example, not less than 90%.

Because the entirety can be thin by utilizing the configuration of the Fresnel lens, a thin optical sheet can be formed to include the intermediate layer 30 having a Fresnel lens-like configuration, the first optical layer 10, and the second optical layer 20 such that the fourth major surface 20b is parallel to the first major surface 10a. It may be considered to use a configuration in which such a thin optical sheet is adhered to the inner surface or the outer surface of the lens of the glasses. However, in the case where such an optical sheet is adhered onto the lens of the glasses having a curved configuration, the optical sheet bends along the curved surface of the lens; the multiple protrusions 12 and the multiple recesses 22 of the Fresnel lens change from the prescribed configuration; and the desired characteristics are not obtained.

Further, it is practically extremely difficult and unrealistic to pattern the second major surface 10b and the third major surface 20a to consider the adhesion onto the lens of the glasses having the curved configuration.

Thus, it was found that the desired optical characteristics cannot be ensured in the case where a Fresnel mirror having a sheet configuration is adhered to a glasses lens portion having a curved configuration in a head mounted display device having a configuration in which the Fresnel mirror is used in the glasses lens portion that is used to form the reflective surface of the display image. The design and the manufacture of a Fresnel mirror to function when bent into a curved configuration are difficult.

Conversely, in the display device 120 according to the embodiment, the optical unit 42 having the desired characteristics can be easily constructed. For example, a base member (e.g., a transparent resin and the like) including the second major surface 10b is formed using, for example, a die having the Fresnel lens structure on the surface of the die. This base member may be glass and the like. In such a case, the surface of the Fresnel lens structure may be formed in the surface that becomes the second major surface 10b by a method such as etching, machining, and the like. Subsequently, the intermediate layer 30 is formed on the second major surface 10b by, for example, vapor deposition and the like. Subsequently, for example, a layer of a transparent resin material used to form the second optical layer 20 is formed on the intermediate layer 30. Subsequently, the first major surface 10a and the fourth major surface 20b are formed in any configuration by any method. Thereby, the optical unit having the desired optical characteristics (the optical characteristics of the image light 51 and the optical characteristics of the transmitted light 53) is easily obtained. The manufacturing method recited above is an example; and any method for manufacturing may be applied in the embodiment.

The display device 120 (and the display device 110 and the like) are obtained by mounting the optical unit 42 thus obtained and the image projection unit 50 to the mounting unit 60.

As illustrated in FIG. 7A and FIG. 7B, the multiple protrusions 12 have a height h along the Z-axis direction. Also, the multiple recesses 22 have a depth h along the Z-axis direction.

The distance along the X-axis direction between the multiple protrusions 12 (the recesses 22) is, for example, a distance px. The distance along the Y-axis direction between the multiple recesses 22 (the protrusions 12) is, for example, a distance py.

As illustrated in FIG. 8, in the display device 120 as well, it is favorable for the optical axis 30o of the intermediate layer 30 for the image light 51 to substantially match the optical axis 40o of the optical unit 40 for the transmitted light 53. It is favorable for the distance between the position of the optical axis 30o and the position of the optical axis 40o to be not more than 500 m.

As illustrated in FIG. 8, the distances (e.g., the pitches) between two most proximal protrusions 12 of the multiple protrusions 12 in the X-axis direction are a distance px1 and a distance px2. For example, the distance px1 is the spacing between the multiple protrusions 12 in the region between one X-axis-direction end of the first major surface 10a and the optical axis 30o for the image light 51 (the reflected light 52). For example, the distance px2 is the spacing between the multiple protrusions 12 in the region between the other X-axis-direction end of the first major surface 10a and the optical axis 30o for the image light 51. In this example, the distance px1 is substantially equal to the distance px2.

The distances (e.g., the pitches) between two most proximal protrusions 12 of the multiple protrusions 12 in the Y-axis direction are a distance py1 and a distance py2. For example, the distance py1 is the spacing between the multiple protrusions 12 in the region between one Y-axis-direction end of the first major surface 10a and the optical axis 30o for the image light 51. For example, the distance py2 is the spacing between the multiple protrusions 12 in the region between the other Y-axis-direction end of the first major surface 10a and the optical axis 30o for the image light 51. In this example, the distance py1 is substantially equal to the distance py2. Also, the distance py1 is substantially equal to the distance px1.

In other words, in this example, the protruding portion 11 has a circular configuration as viewed along the Z-axis direction; and the multiple protrusions 12 are concentric circles.

It is favorable for the distances (e.g., the pitches such as the distance px1, the distance px2, the distance py1, and the distance py2, etc.) between the two most proximal protrusions 12 of the multiple protrusions 12 to be not less than 100 μm and not more than 1000 μm. Similarly, it is favorable for the distance between the two most proximal recesses 22 of the multiple recesses 22 to be not less than 100 μm and not more than 1000 μm.

In the case where the pitch of the Fresnel lens structure is too narrow, the image quality decreases due to effects of diffraction. The decrease of the image quality substantially can be suppressed by the pitch width being not less than 100 μm. In the case where the pitch of the Fresnel lens structure is too wide, the multiple protrusions 12 or the multiple recesses 22 become easily noticeable; and the image quality decreases. In the embodiment, the distance between the first major surface 10a of the optical unit and the eye 81 of the human viewer 80 is, for example, not less than 5 millimeters (mm) and not more than 30 mm. The decrease of the image quality caused by the coarse pitch is practically permissible when the pitch is not more than 1000 μm because the eye is not in focus when the distance between the first major surface 10a and the eye 81 of the human viewer 80 is this short.

In the display device 120, the Fresnel mirror surface is built into the interior of the optical unit 42. Therefore, for example, the optical unit 42 operates similarly to normal glasses with respect to the background image 53i of the external environment. Simultaneously, the optical unit 42 operates as a reflection screen with respect to the projected display image. Thereby, a display having low distortion and a wide visual field is possible. In particular, in an AR display, a good image can be provided to the human viewer 80.

FIG. 10A to FIG. 10F are schematic cross-sectional views illustrating configurations of display devices according to the second embodiment.

These drawings correspond to, for example, the cross section along line A1-A2 of FIG. 4. These drawings illustrate several examples of optical units usable in the display device 120 according to the embodiment.

Figure 10A:
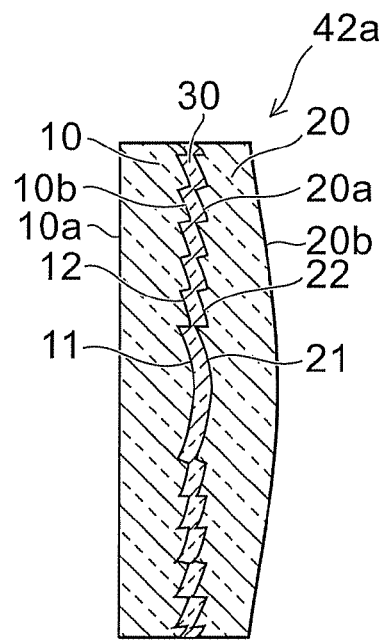
FIG. 10A to FIG. 10F are schematic cross-sectional views showing configurations of display devices according to the second embodiment.

In an optical unit 42a as illustrated in FIG. 10A, the first major surface 10a is substantially a plane. The fourth major surface 20b protrudes in a curved configuration.

Figure 10B:
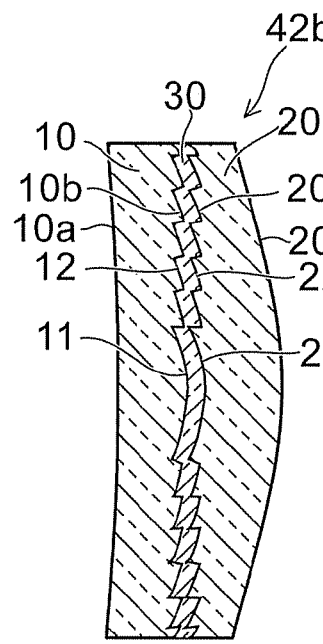

In an optical unit 42b as illustrated in FIG. 10B, the first major surface 10a is recessed in a curved configuration. The fourth major surface 20b protrudes in a curved configuration. In this example, the curvature of the first major surface 10a is smaller than the curvature of the fourth major surface 20b.

Figure 10C:
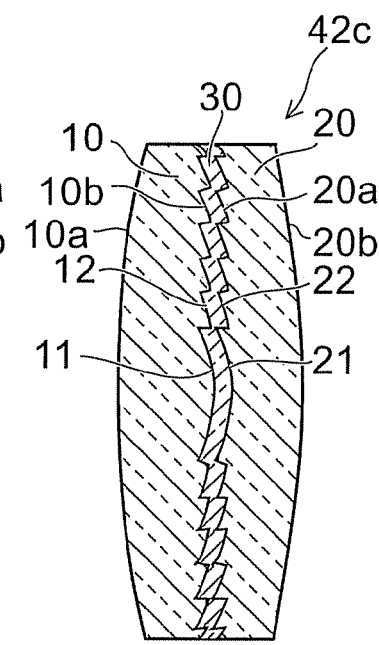

In an optical unit 42c as illustrated in FIG. 10C, the first major surface 10a protrudes in a curved configuration. The fourth major surface 20b protrudes in a curved configuration.

Figure 10D:
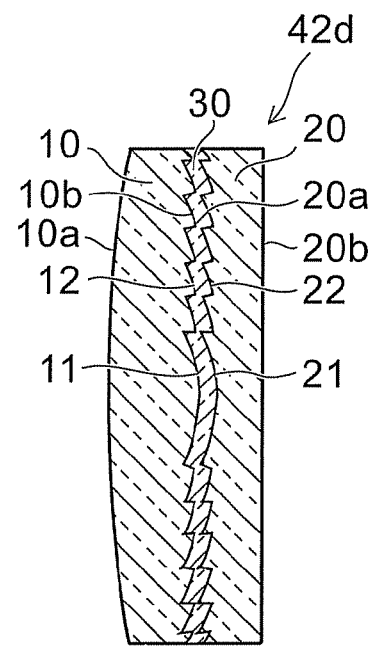

In an optical unit 42d as illustrated in FIG. 10D, the first major surface 10a protrudes in a curved configuration. The fourth major surface 20b is substantially a plane.

The optical units 42a, 42b, 42c, and 42d function as convex lenses for the transmitted light 53.

Figure 10E:
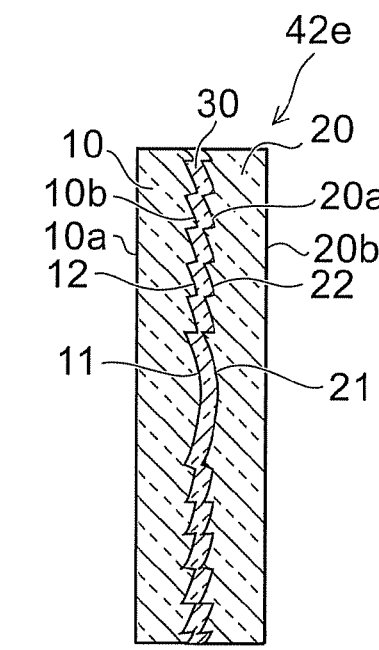

In an optical unit 42e as illustrated in FIG. 10E, the first major surface 10a is recessed in a curved configuration. The fourth major surface 20b is substantially a plane. The optical unit 42e functions as a concave lens for the transmitted light 53.

Figure 10F:
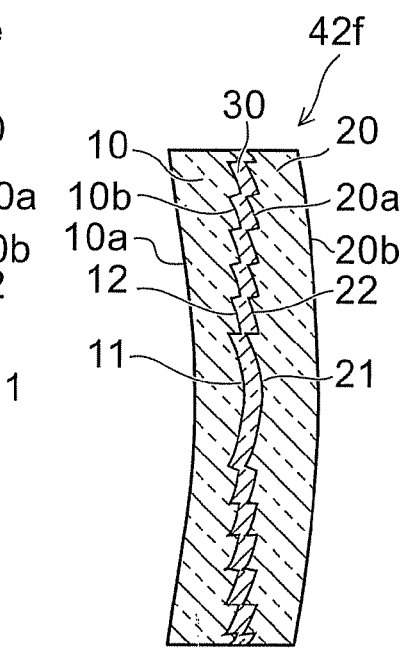

In an optical unit 42f as illustrated in FIG. 10F, the first major surface 10a is recessed in a curved configuration. The fourth major surface 20b protrudes in a curved configuration. The curvature of the first major surface 10a is the same as the curvature of the fourth major surface 20b. The fourth major surface 20b is parallel to the first major surface 10a.

The optical unit 42f does not function to enlarge or reduce the image of the transmitted light 53. For example, the optical unit 42f satisfies the design preferences of the user or provides ease of use to the user.

In the display devices 110 and 120 according to the embodiments, the image light 51 is projected onto the optical unit disposed in front of the eye 81 of the human viewer 80 from the side of the eye 81 or from above the eye 81. At this time, the distortion of the image can be reduced by the reflective characteristics of the optical unit being asymmetrical. For example, the reflective characteristics of the optical unit are asymmetrical with respect to a plane including a direction from the first major surface 10a toward the second major surface 10b. The case where the display device 120 uses the configuration of the Fresnel lens will now be described.

FIG. 11A to FIG. 11C and FIG. 12A to FIG. 12C are schematic cross-sectional views illustrating configurations of display devices according to the second embodiment.

These drawings illustrate several examples of optical units usable in the display device 120 according to the embodiment. These drawings illustrate configurations, i.e., the configurations of the protruding portion 11 and the multiple protrusions 12 (the configurations of the recessed portion 21 and the multiple recesses 22), of the Fresnel lens provided in the optical unit.

Figure 11A:
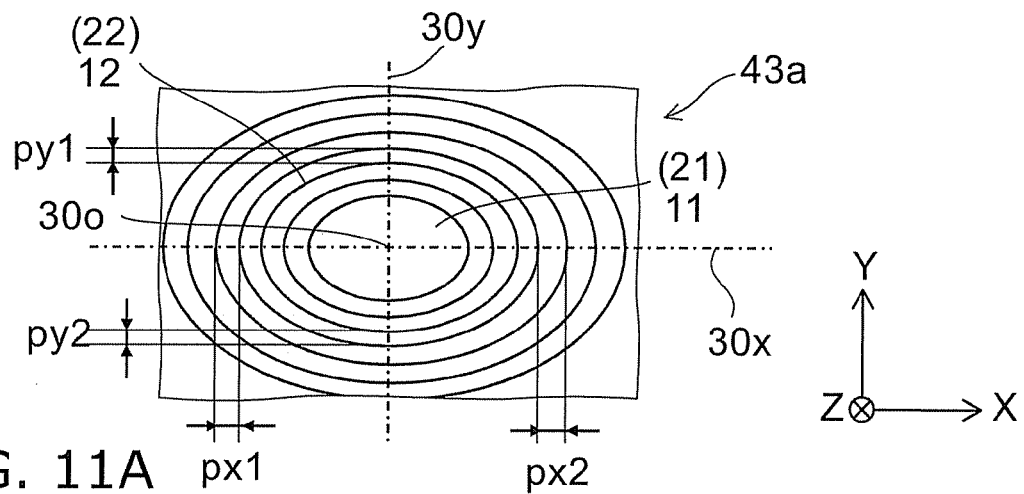
FIG. 11A to FIG. 11C and FIG. 12A to FIG. 12C are schematic cross-sectional views showing configurations of display devices according to the second embodiment.

In an optical unit 43a as illustrated in FIG. 11A, the configuration of the protruding portion 11 when viewed along the Z axis is a flattened circle (including an ellipse). The configurations of the multiple protrusions 12 when viewed along the Z axis are concentric flattened circles.

In this example, the length along the X-axis direction of the protruding portion 11 is longer than the length along the Y-axis direction of the protruding portion 11. In one protrusion 12, the length along the X-axis direction is longer than the length along the Y-axis direction. The distance px1 and the distance px2 are longer than the distance py1 and the distance py2.

Figure 11B:
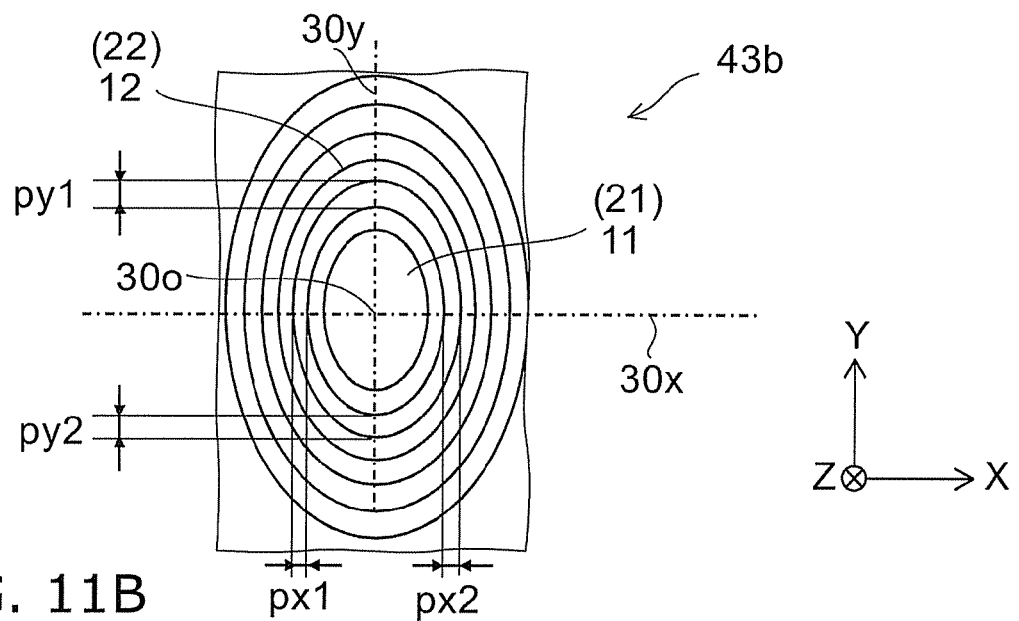

In an optical unit 43b as illustrated in FIG. 11B, the configuration of the protruding portion 11 when viewed along the Z axis is a flattened circle (including an ellipse). The configurations of the multiple protrusions 12 when viewed along the Z axis are concentric flattened circles.

In this example, the length along the X-axis direction of the protruding portion 11 is shorter than the length along the Y-axis direction of the protruding portion 11. In one protrusion 12, the length along the X-axis direction is shorter than the length along the Y-axis direction. The distance px1 and the distance px2 are shorter than the distance py1 and the distance py2.

Thus, the spacing (e.g., the distance px1 and the distance px2) between the multiple protrusions 12 along the second direction (e.g., the X-axis direction) perpendicular to the first direction (e.g., the Z-axis direction) from the first major surface 10a toward the second major surface 10b may be different from the spacing (e.g., the distance py1 and the distance py2) between the multiple protrusions 12 along the third direction (e.g., the Y-axis direction) perpendicular to the first direction and the second direction.

For example, the relationship between the distance px1 and the distance px2 along the X-axis direction and the distance py1 and the distance py2 along the Y-axis direction is appropriately defined based on, for example, the relative positions of the optical unit, the image projection unit 50, and the eye 81 of the human viewer 80.

The change of the height h of each of the multiple protrusions 12 between the multiple protrusions 12 may change between the X-axis direction and the Y-axis direction.

Figure 11C:
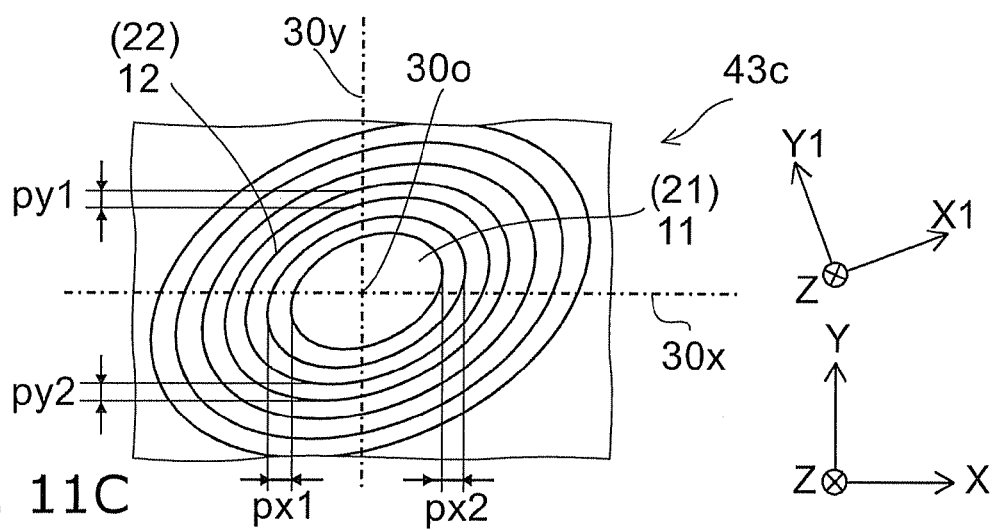

In an optical unit 43c as illustrated in FIG. 11C, the configuration of the protruding portion 11 when viewed along the Z axis is a flattened circle (including an ellipse); and the axis of the flattened circle is rotated around the Z axis. For example, the direction of the major axis of the protruding portion 11 is taken as an X1 axis direction; and the axis of the minor-axis direction is taken as a Y1 axis direction. In this example, the X1 axis is non-parallel to the X axis; and the Y1 axis is non-parallel to the Y axis.

Figure 12A:
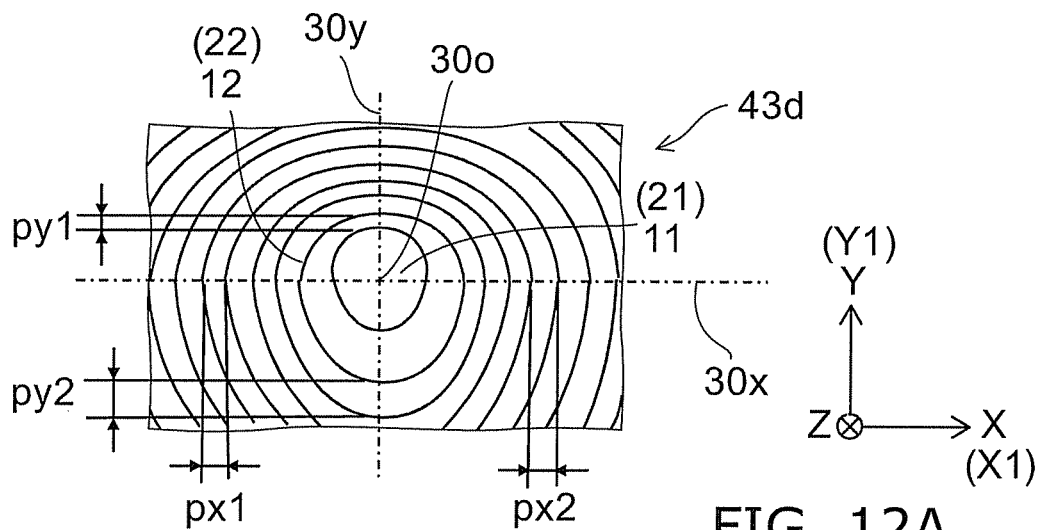

In an optical unit 43d as illustrated in FIG. 12A, the configuration of the protruding portion 11 when viewed along the Z axis is asymmetrical with respect to the X axis (an axis 30x). In this example, the spacing (e.g., the distance py1) between the multiple protrusions 12 at one position is different from the spacing (e.g., the distance py2) between the multiple protrusions 12 at a position symmetric to the one position with respect to the X axis. Thus, the spacing between the multiple protrusions 12 may be asymmetrical in the X-axis direction.

Figure 12B:
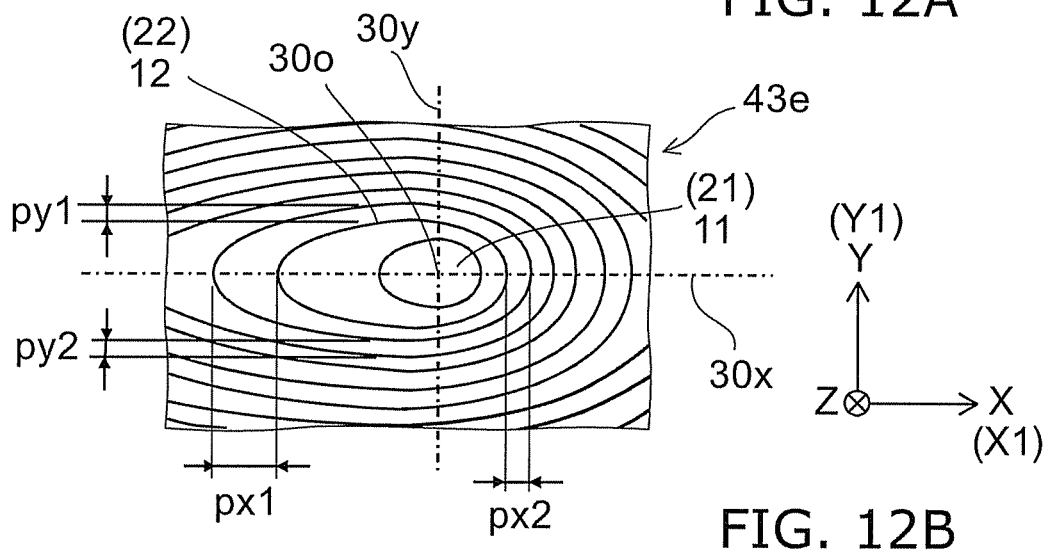

In an optical unit 43e as illustrated in FIG. 12B, the configuration of the protruding portion 11 when viewed along the Z axis is asymmetrical with respect to the Y axis (an axis 30y). In this example, the spacing (e.g., the distance px1) between the multiple protrusions 12 at one position is different from the spacing (e.g., the distance px2) between the multiple protrusions 12 at a position symmetric to the one position with respect to the Y axis. Thus, the spacing between the multiple protrusions 12 may be asymmetrical in the Y-axis direction.

Figure 12C:
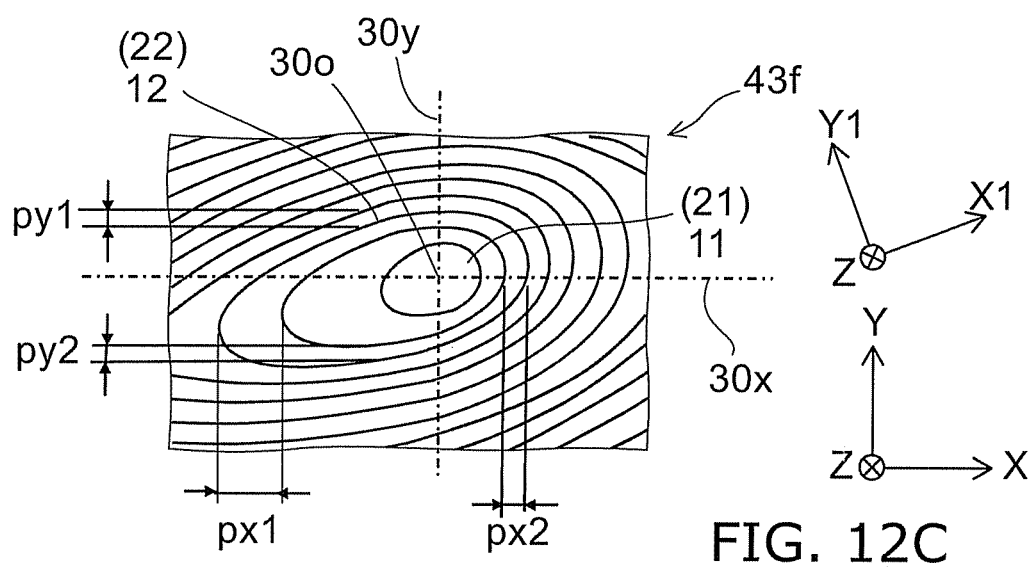

In an optical unit 43f as illustrated in FIG. 12C, the configuration of the protruding portion 11 when viewed along the Z axis is asymmetrical with respect to the X axis (the axis 30x) and asymmetrical with respect to the Y axis (the axis 30y). In this example, the distance py1 is different from the distance py2; and the distance px1 is different from the distance px2.

The multiple protrusions 12 of the optical unit 43f may be the multiple protrusions 12 of the optical unit 43e rotated around the Z axis. In other words, in the optical unit 43f, the X1 axis is non-parallel to the X axis; and the Y1 axis is non-parallel to the Y axis.

The embodiment is not limited thereto. The configurations of the multiple protrusions 12 are arbitrary.

The change of the height h of each of the multiple protrusions 12 between the multiple protrusions 12 may change between the upper side and the lower side as viewed by the human viewer 80. The change of the height h of each of the multiple protrusions 12 between the multiple protrusions 12 may change between the left side and the right side as viewed by the human viewer 80. The change of the height h of each of the multiple protrusions 12 between the multiple protrusions 12 may change between the upper side and the lower side and simultaneously between the left side and the right side as viewed by the human viewer 80.

The height h of each of the multiple protrusions 12 may be different between the region between any axis (e.g., the second axis) perpendicular to the Z-axis direction and one end of the second major surface 10b and the region between the second axis and the other end of the second major surface 10b.

Figure 13:
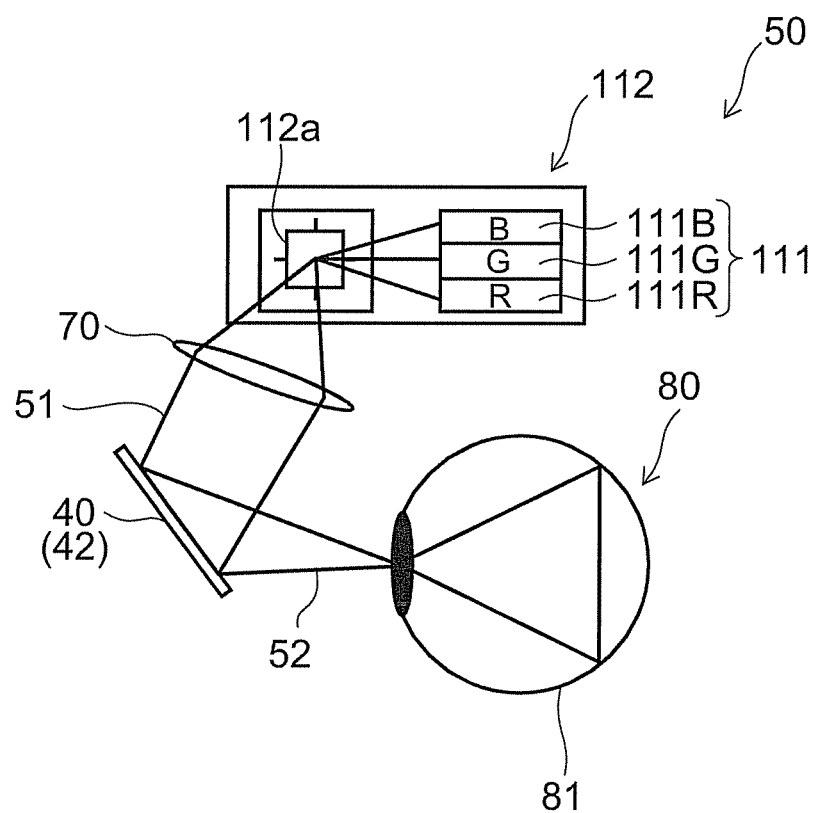
FIG. 13 is a schematic view illustrating the configuration of the display device according to the embodiments.

FIG. 13 is a schematic view illustrating the configuration of the display device according to the embodiments.

FIG. 13 illustrates one example of the configuration of the image projection unit 50 that can be used in the display devices 110 and 120 according to the embodiments recited above.

In this example, a scanning laser direct retinal display is used as the image projection unit 50.

As illustrated in FIG. 13, the image projection unit 50 includes an image engine 112 and an optical element 70. In this example, the image engine 112 includes a light source 111 (a blue light source 111B, a green light source 111G, and a red light source 111R) and an optical switch 112a. In this example, the optical element 70 includes an ocular optical system (e.g., a lens and the like). The optical element 70 may include, for example, a relay optical system and the like.

The blue light source 111B, the green light source 111G, and the red light source 111R may include a blue laser, a green laser, and a red laser, respectively. The optical switch 112a may include, for example, a MEMS (Micro Electro Mechanical Systems) scanner.

Light having a luminance that is adjusted according to an image signal is output from the light source 111. The light output from the light source 111 is incident on the reflective surface of the MEMS device. A MEMS scanner changes the direction of the incident light. The light reflected at the MEMS scanner is scanned along the horizontal direction and the perpendicular direction. Thereby, the image is formed.

The optical element 70 and the optical unit are provided in the optical path of the light between the MEMS scanner and the eye 81 of the human viewer 80. The optical unit may include one selected from the optical units described in regard to the first and second embodiments or a modification of the optical units described in regard to the first and second embodiments. The case will now be described where the optical unit 40 is used as the optical unit.

The optical unit 40 reflects the scanned light (the image light 51); and the reflected light 52 enters the eye 81 of the human viewer 80. Thereby, the image is displayed on the retinal surface of the eye 81. In this example, the optical element 70 is provided in the optical path between the MEMS scanner and the eye 81; and the optical unit 40 is provided in the optical path between the optical element 70 and the eye 81.

The human viewer 80 can view both the actual view and the display image displayed by the image projection unit 50 through the optical unit 40. Thereby, the display image appears to overlay the actual view.

According to the embodiments, a display device that is easy to view and use is provided.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in display devices such as image projection units, optical units, first optical layers, second optical layers, intermediate layers, mounting units, and the like from known art; and such practice is included in the scope of the invention to the extent that similar effects are obtained.

Further, any two or more components of the specific examples may be combined within the extent of technical feasibility and are included in the scope of the invention to the extent that the purport of the invention is included.

Moreover, all display devices practicable by an appropriate design modification by one skilled in the art based on the display devices described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A display device, comprising:
   an image projection unit to emit an image light including an image;
   an optical unit including:
   a first optical layer having a first major surface and a second major surface on a side opposite to the first major surface, the first optical layer being light-transmissive, the second major surface including a protruding portion having a surface having a curved configuration;
   a second optical layer having a third major surface and a fourth major surface on a side opposite to the third major surface, the second optical layer being light-transmissive, the third major surface facing the second major surface and including a recessed portion recessed along the protruding portion; and
   an intermediate layer provided between the second major surface and the third major surface, at least a portion of the image light travelling from the first major surface toward the second major surface being reflected by the intermediate layer and a reflected light being obtained at the intermediate layer, at least a portion of a background light travelling from the fourth major surface toward the third major surface being transmitted by the intermediate layer, at least one selected from the first major surface and the fourth major surface being a curved surface; and
   a mounting unit linked to the image projection unit and the optical unit to regulate a relative positional relationship between the optical unit and an eye of a human viewer to cause the image light to enter the optical unit from the first major surface and to cause the reflected light to emerge from the second major surface to enter the eye of the human viewer,
   wherein an first optical axis of the intermediate layer when the image light enters the optical unit from the first major surface and is reflected at the intermediate layer matches an second optical axis when a light entering from the fourth major surface passes through the third major surface, the intermediate layer, the second major surface, and the first major surface.

2. The device according to claim 1, wherein a curvature of the first major surface is larger than a curvature of the fourth major surface.

3. The device according to claim 1, wherein a curvature of the first major surface is smaller than a curvature of the fourth major surface.

4. The device according to claim 1, wherein a distance between the first optical axis of the intermediate layer and the second optical axis is not more than 500 micrometers.

5. The device according to claim 1, wherein
   the second major surface further includes a plurality of protrusions provided around the protruding portion to be concentric with the protruding portion, and
   the third major surface further includes a plurality of recesses provided around the recessed portion to be concentric with the recessed portion, each of the plurality of protrusions conforming to each of the plurality of recesses.

6. The device according to claim 5, wherein a distance between two most proximal protrusions of the plurality of protrusions is not less than 100 micrometers and not more than 1000 micrometers.

7. The device according to claim 5, wherein a spacing between the plurality of protrusions along a second direction perpendicular to a first direction from the first major surface toward the second major surface is different from a spacing between the plurality of protrusions along a third direction perpendicular to the first direction and the second direction.

8. The device according to claim 5, wherein the protruding portion has a circular configuration as viewed along a first direction from the first major surface toward the second major surface, and the plurality of protrusions is concentric around a center of the circular configuration of the protruding portion.

9. The device according to claim 1, wherein a refractive index of the first optical layer is same as a refractive index of the second optical layer.

10. The device according to claim 1, wherein an absolute value of a difference between a refractive index of the first optical layer and a refractive index of the second optical layer is not more than $1\times10^{-3}$.

11. The device according to claim 1, wherein the intermediate layer is a metal film or a metal compound film.

12. The device according to claim 1, wherein the image light is a laser light.

13. The device according to claim 1, wherein the image projection unit is configured to emit the image light including a blue laser, a green laser and a red laser.

14. The device according to claim 1, wherein the intermediate layer includes a plurality of first layers and a second layer provided between the first layers, the second layer having a refractive index different from a refractive Index of the first layers.

15. The device according to claim 1, wherein a transmittance with respect to a green light of the intermediate layer is not less than 90%.

16. The device according to claim 1, wherein a material of at least one of the first optical layer and the second optical layer is a transparent resin.

17. The device according to claim 1, wherein reflective characteristics of the optical unit are asymmetrical.

18. The device according to claim 1, wherein the protruding portion has a flattened circular configuration as viewed along a first direction from the first major surface toward the second major surface.

19. The device according to claim 1, wherein the optical unit is configured to correct a vision of the human viewer.

* * * * *